J. T. LANGFORD, DEC'D.
E. M. PRIEST, ADMINISTRATRIX.
COMPOSITE PIPE.
APPLICATION FILED MAR. 7, 1907.

913,662.

Patented Feb. 23, 1909.
2 SHEETS—SHEET 1.

Witnesses:
H. B. Davis
Cynthia Doyle

Inventor:
John T. Langford
by Noyes & Hammun
Attys.

J. T. LANGFORD, DEC'D.
E. M. PRIEST, ADMINISTRATRIX.
COMPOSITE PIPE.
APPLICATION FILED MAR. 7, 1907.

913,662.

Patented Feb. 23, 1909.
2 SHEETS—SHEET 2.

Witnesses:
H. B. Davis
Cynthia Doyle

Inventor:
John T. Langford
by Noyes & Kinniman
Atty's

UNITED STATES PATENT OFFICE.

JOHN T. LANGFORD, OF NEWTON, MASSACHUSETTS; ELLEN MABEL PRIEST ADMINISTRATRIX OF SAID JOHN T. LANGFORD, DECEASED.

COMPOSITE PIPE.

No. 912,662.   Specification of Letters Patent.   Patented Feb. 23, 1909.

Application filed March 7, 1907. Serial No. 361,110.

*To all whom it may concern:*

Be it known that I, JOHN T. LANGFORD, of Newton, county of Middlesex, State of Massachusetts, have invented an Improvement in Composite Pipes, of which the following description, in connection with the accompanying drawings, is a specification, like characters on the drawings representing like parts.

This invention relates to certain improvements in cement or composite pipes, and particularly those which comprise a reinforcing metal casing, lined and coated with cement, and has for its object the production of a composite pipe which shall be proof against oxidation or electrolytic action. I accomplish this object by the means shown in the accompanying drawing, and by the method hereafter described.

Figures 1, 2:
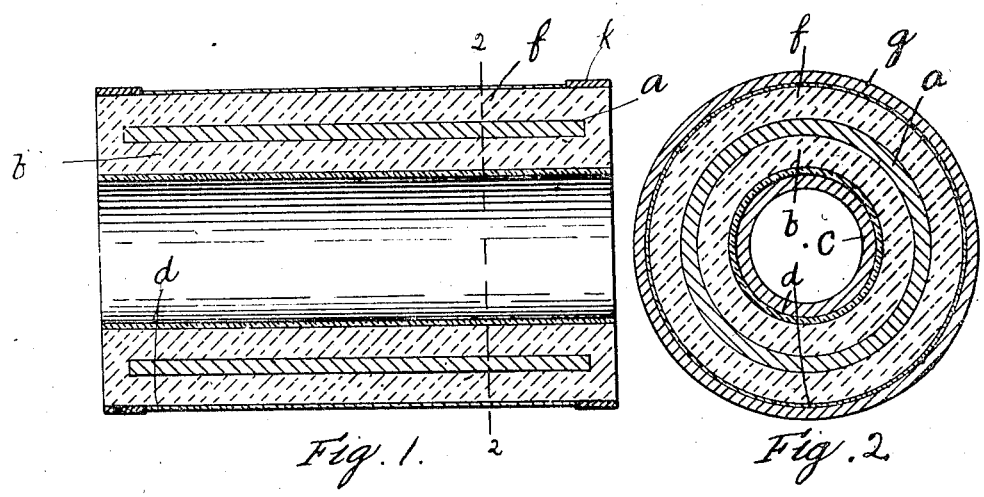
Figure 3:
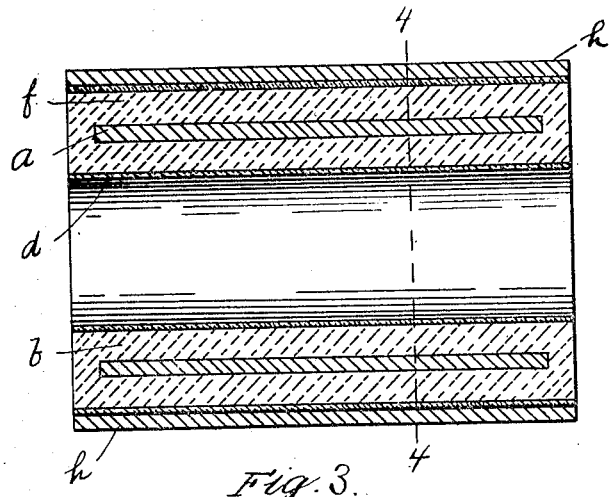
Figure 4:
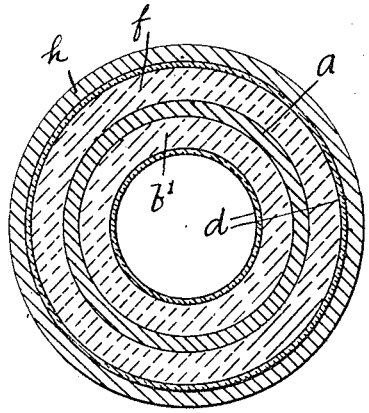
Figure 5:
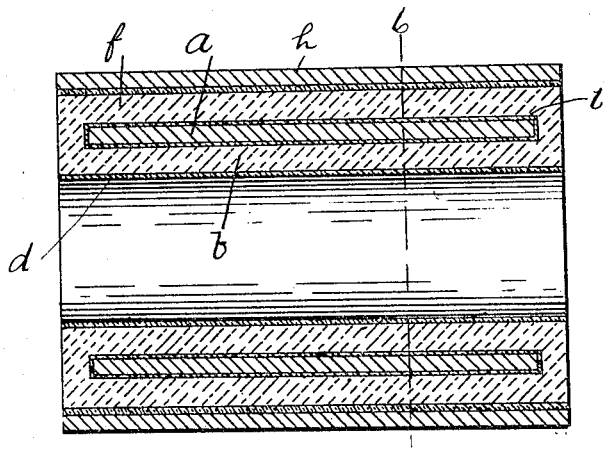
Figure 6:
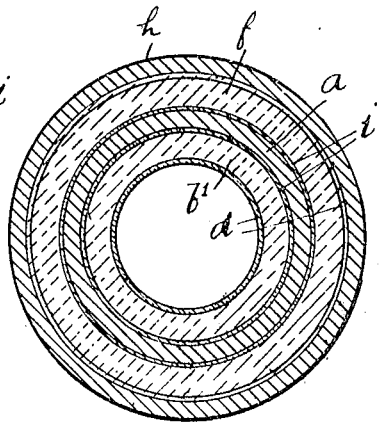

In the accompanying drawings, Figure 1 is a central longitudinal section of a pipe section illustrating a preferred form of composite pipe embodying my invention. Fig. 2 is a cross section on the line 2—2 of Fig. 1, showing the molding devices before they are removed. Figs. 3 and 5 are central, longitudinal sections of different modified forms of my invention. Fig. 4 is a cross section on the line 4—4 of Fig. 3. Fig. 6 is a cross section on the line 6—6 of Fig. 5.

In Figs. 1 and 2, I illustrate a preferred form of pipe which I have produced. In said figures, *a* indicates a metal tube, which may or may not be imperforate, and which is provided with a cement lining *b* and a cement coating *f*, said lining and coating being extended beyond the ends of the pipe *a* and homogeneously united so as to provide monolithic terminals at each end of the pipe section. In making this form of pipe the molding devices are preferably held vertically, as in my prior patent #750,660, and the cement is compacted about the tube *a* within a wax lined flask *g* and about a wax covered core *c* within the tube *a*, the cement covering and lining being extended beyond each end of the tube *a* and there homogeneously united so that the tube is completely embedded in the cement. After the cement has become sufficiently set the core and flask will be removed, after first heating them sufficiently to disconnect the wax therefrom. A coating and lining of wax *d* will thus be left upon the outer and inner surfaces of the cement body in which the tube *a* is embedded. In order to provide the tube *a* with a cement incasement which is thoroughly water-proof or impervious to moisture, I then immerse the whole pipe in a bath of liquid wax and dissolve the wax coating and lining left by the core and flask, and fill the pores of the cement, or cause them to become thoroughly impregnated with the wax, leaving the cement with a smooth glazed surface.

Instead of casting the cement body within a removable flask, as above described, the pipe may be cast within a metal shell or water-proof covering *h*, as shown in Fig. 3, which may become a permanent part of the pipe. And in this instance the shell or covering *h* may be provided with a lining of wax before the cement is cast therein. The pipe illustrated in Figs. 3 and 4 is otherwise identical with that illustrated in Fig. 1.

In Fig. 5 I show a further modified form of my invention, in which the metal tube *a* is illustrated as being provided with an impervious coating *i* both externally, internally and at each end, thus providing an additional means for preventing access of moisture to the embedded pipe. In producing this form of my invention the tube *a* is provided with the impervious coating *i*, previous to the casting operation, which is otherwise the same as that already described, the pipe illustrated in Figs. 5 and 6 being otherwise identical with that illustrated in Figs. 3 and 4.

In the form of my invention shown in Fig. 1, in which the outer metal covering is omitted, I provide the ends of the pipe section with encircling metal bands or rings *k* for the purpose of making a leaded or similar joint with the adjacent pipe sections. These rings *k* are unnecessary when I employ the outer metal covering *h*, as in Figs. 3 and 6.

The process of making the cement or composite pipe herein shown and described forms the subject matter of a divisional application filed January 27th, 1909, Serial No. 474,368.

Having thus described my invention, what I claim as new and desire to secure by Letters Patent is:—

1. A pipe of the character described, comprising a metal tube having a covering and a lining of cement united beyond the ends of the tube to provide monolithic terminals.

2. A pipe of the character described comprising a metal tube having a covering and a lining of cement united beyond the ends of the tube to provide monolithic terminals said lining being provided with a lining of water-proof material.

3. A pipe of the character described comprising a metal tube having a covering and a lining of water-proof cement united beyond the ends of the tube to seal the same completely.

4. A pipe of the character described comprising a metal tube having a cement covering and a wax-impregnated cement lining, said lining and covering being united beyond the ends of the tube to provide monolithic terminals.

5. A pipe of the character described comprising a metal tube having a covering and lining of wax-impregnated cement united beyond the ends of the tube to provide monolithic terminals.

6. A pipe of the character described comprising a metal tube having a covering and a lining of cement impregnated and coated with a water-proof material, said covering and lining being united beyond the ends of the tube to provide monolithic terminals.

7. A pipe of the character described comprising a metal tube having a lining and covering of cement, and waterproofing means for said lining and covering and the terminals of said tube.

8. A pipe of the character described comprising a metal tube having its interior, exterior and ends provided with an impervious coating, and lined and covered with cement, said covering and lining being united beyond the ends of said tube to incase the same completely.

In testimony whereof, I have signed my name to this specification, in the presence of two subscribing witnesses.

JOHN T. LANGFORD.

Witnesses:
L. H. HARRIMAN,
H. B. DAVIS.